United States Patent
Bageshwar et al.

(10) Patent No.: US 9,851,437 B2
(45) Date of Patent: Dec. 26, 2017

(54) ADJUSTING WEIGHT OF INTENSITY IN A PHD FILTER BASED ON SENSOR TRACK ID

(71) Applicant: Honeywell International Inc., Morristown, NJ (US)

(72) Inventors: Vibhor L. Bageshwar, Minneapolis, MN (US); Michael Ray Elgersma, Plymouth, MN (US); Eric A. Euteneuer, St. Anthony Village, MN (US)

(73) Assignee: Honeywell International Inc., Morris Plains, NJ (US)

( * ) Notice: Subject to any disclaimer, the term of this patent is extended or adjusted under 35 U.S.C. 154(b) by 324 days.

(21) Appl. No.: 14/448,813

(22) Filed: Jul. 31, 2014

(65) Prior Publication Data
US 2016/0033633 A1    Feb. 4, 2016

(51) Int. Cl.
*G01S 13/66*    (2006.01)
*G01S 13/93*    (2006.01)
(Continued)

(52) U.S. Cl.
CPC ............ *G01S 13/66* (2013.01); *G01S 13/726* (2013.01); *G01S 13/86* (2013.01); *G01S 13/865* (2013.01);
(Continued)

(58) Field of Classification Search
CPC ........ G01S 13/66; G01S 13/726; G01S 13/86; G01S 13/865; G01S 13/867; G01S 13/9303; G01S 17/66
(Continued)

(56) References Cited

U.S. PATENT DOCUMENTS

| | | | |
|---|---|---|---|
| 4,816,833 A | | 3/1989 | Ferguson et al. |
| 5,390,133 A | * | 2/1995 | Sohie .................... G01S 3/7865 342/159 |

(Continued)

FOREIGN PATENT DOCUMENTS

WO    2014011288    1/2014

OTHER PUBLICATIONS

European Patent Office, "Extended European Search Report from EP Application No. 15176942.9 dated Jan. 4, 2016", from Foreign Counterpart of U.S. Appl. No. 14/448,813, pp. 1-8, Published in: EP.
Panta et al., "Novel Data Association Schemes for the Probability Hypothesis Density Filter", IEEE Transactions on Aerospace and Electronics Systems, Apr. 1, 2007, pp. 556-570, vol. 43, No. 2.
Chen et al., "Multi-Sensor Data Integration for Autonomous Sense and Avoid", Mar. 29-31, 2011, pp. 1-14, Publisher: American Institute of Aeronautics and Astronautics, Published in: St. Louis, Missouri.
(Continued)

*Primary Examiner* — Timothy A Brainard
(74) *Attorney, Agent, or Firm* — Fogg & Powers LLC

(57) ABSTRACT

In one embodiment, a method for tracking multiple objects with a probabilistic hypothesis density filter is provided. The method includes comparing second track IDs corresponding to newly obtained measurements to one or more first track IDs corresponding to a $T_{k+1}$ predicted intensity having a predicted weight. If all of the one or more first track IDs match any of the second track IDs, the predicted weight is multiplied by a first value. If less than all of the one or more first track IDs match any of the second track IDs, the predicted weight is multiplied by a second value, wherein the second value is greater than the first value. The method then determines whether to prune the $T_{k+1}$ predicted intensity based on the predicted weight after multiplying with either the first value or the second value.

20 Claims, 3 Drawing Sheets

(51) Int. Cl.
*G01S 13/72* (2006.01)
*G01S 13/86* (2006.01)
*G01S 17/66* (2006.01)

(52) U.S. Cl.
CPC ........ *G01S 13/867* (2013.01); *G01S 13/9303* (2013.01); *G01S 17/66* (2013.01)

(58) Field of Classification Search
USPC .......................................................... 342/29
See application file for complete search history.

(56) References Cited

U.S. PATENT DOCUMENTS

| | | |
|---|---|---|
| 6,967,616 B2 | 11/2005 | Etnyre |
| 7,256,729 B2 | 8/2007 | Bummerstede |
| 7,626,535 B2 | 12/2009 | Ding et al. |
| 7,864,096 B2 | 1/2011 | Stayton et al. |
| 8,378,881 B2 | 2/2013 | LeMire et al. |
| 8,515,881 B2 | 8/2013 | Schwoegler et al. |
| 2009/0212994 A1 | 8/2009 | Hamza et al. |
| 2012/0221273 A1* | 8/2012 | Furukawa ............... G01S 7/003 702/94 |
| 2013/0229298 A1 | 9/2013 | Eckstein et al. |

OTHER PUBLICATIONS

Fasano et al., "Multi-Sensor Data fusion: A Tool to Enable UAS Integration into Civil Airspace", "30th Digital Avionics Systems Conference", Oct. 16-20, 2011, pp. 1-28, Published in: Seattle, WA.

Jovanoska et al., "Multiple target tracking by a distributed UWB sensor network based on the PHD filter", "2012 15th International Conference on Information Fusion", Jul. 9-12, 2012, pp. 1095-1102, Publisher: IEEE, Published in: DE.

Mahler, "Multitarget Bayes Filtering via First-Order Multitarget Moments", "IEEE Transactions on Aerospace and Electronic Systems", Oct. 2003, pp. 1152-1178, vol. 39, No. 4, Publisher: IEEE.

Panta et al., "Data Association and Track Management for the Gaussian Mixture Probability Hypothesis Density Filter", "IEEE Transactions on Aerospace and Electronics Systems", Jul. 2009, pp. 1003-1016, vol. 45, No. 3, Publisher: IEEE.

Vo et al., "Tha Gaussian Mixture Probability Hypothesis Density Filter", "IEEE Transactions Signal Processing", Nov. 2006, pp. 4091-4104, vol. 54, No. 11, Publisher: IEEE.

* cited by examiner

ADJUSTING WEIGHT OF INTENSITY IN A PHD FILTER BASED ON SENSOR TRACK ID

CROSS-REFERENCE TO RELATED APPLICATIONS

This application is related to the following co-pending United States patent applications, which are hereby incorporated herein by reference:

U.S. patent application Ser. No. 14/448,808 entitled "MERGING INTENSITIES IN A PHD FILTER BASED ON A SENSOR TRACK ID" filed on even date herewith;

U.S. patent application Ser. No. 14/448,803 entitled "UPDATING INTENSITIES IN A PHD FILTER BASED ON A SENSOR TRACK ID" filed on even date herewith; and U.S. patent application Ser. No. 14/448,819 entitled "TWO STEP PRUNING IN A PHD FILTER" filed on even date herewith.

BACKGROUND

The objective of see-and-avoid or sense-and-avoid (SAA) is to provide an unmanned aircraft system (UAS) with the capability to perform self-separation and collision avoidance against all air traffic, with or without active, transponder based collision avoidance systems. SAA requires the UAS to detect and track intruder aircraft in the operating vicinity of the ownship aircraft to identify guidance maneuvers required to perform self-separation and collision avoidance. The detect and track functions are key enablers for UAS SAA capability because the UAS cannot perform self-separation or collision avoidance maneuvers for undetected, untracked intruder aircraft. The detect function refers to using surveillance sensors to measure the position of intruder aircraft relative to the ownship UAS. The track function refers to fusing the surveillance sensor measurements together to estimate the trajectory statistics (also referred to herein as the track) of the intruder aircraft relative to the ownship UAS. The surveillance sensors provide measurements with corresponding measurement IDs that can be correlated across time or random across time.

The track function estimates the tracks of the intruder aircraft using a data association algorithm to assign measurements to a current track, a filter to fuse sensor measurements with the current estimates of the track statistics, and a trajectory manager that oversees the sensor fusion operation, initiates tracks, maintains tracks, and deletes tracks.

One tracking system uses random finite sets (RFS) to track multiple intruder aircraft (IA) for UAS SAA, with the RFS being an implementation of a multi-hypothesis testing (MHT) approach. RFS casts the multiple IA tracking problem into a set-valued state space where the statistics of the set-valued state vector and set-valued measurement vector are approximated using their first-order moments (also referred to herein as an intensity), and applied in a Bayesian filter framework to estimate the IA track statistics using Gaussian mixtures. The resulting filter is referred to as a probabilistic hypothesis density (PHD) filter. An intensity refers to a weight, a state mean vector, and a state covariance matrix of an element of the set-valued state space where this element corresponds to the statistics of a track.

SUMMARY

In one embodiment, a method for tracking multiple objects with a probabilistic hypothesis density filter is provided. The method includes obtaining a plurality of measurements corresponding to a first object with at least one sensor, the at least one sensor providing one or more first track IDs for the plurality of measurements. A $T_k$ track intensity is generated for the first object based on the plurality of measurements, the $T_k$ track intensity including a weight, a state mean vector, and a state covariance matrix of statistics of a track of the first object at time $T_k$. A $T_{k+1}$ predicted intensity is generated for the first object based on the $T_k$ track intensity, the $T_{k+1}$ predicted intensity corresponding to time $T_{k+1}$, wherein the $T_{k+1}$ predicted intensity includes a predicted weight based on the weight of the $T_k$ track intensity. A plurality of measurements is obtained from a plurality of sensors, wherein the plurality of sensors include the at least one sensor, wherein the plurality of sensors provide a plurality of second track IDs for the plurality of measurements, wherein the plurality of measurements correspond to time $T_{k+1}$. The plurality of second track IDs is compared to the one or more first track IDs. If all of the one or more first track IDs match any of the plurality of second track IDs, the predicted weight is multiplied by a first value. If less than all of the one or more first track IDs match any of the plurality of second track IDs, the predicted weight is multiplied by a second value, wherein the second value is greater than the first value. The method then determines whether to prune the $T_{k+1}$ predicted intensity based on the predicted weight after multiplying with either the first value or the second value. If the $T_{k+1}$ predicted intensity is not pruned, a $T_{k+1}$ track intensity is generated for the first object at time $T_{k+1}$ based on the $T_{k+1}$ predicted intensity, the $T_{k+1}$ track intensity having an updated weight based on the multiplying of the predicted weight.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments.

DETAILED DESCRIPTION

The subject matter described herein provides for a method of adjusting a weight of an intensity that is being tracked in a probabilistic hypothesis density (PHD) filter by using track identifiers (IDs) provided by one or more sensors. A track ID is an identifier provided by a sensor, wherein the identifier is correlated across time to a series of measurements. One type of track ID is an international civil aviation organization (ICAO) aircraft address that is transmitted by an aircraft along with corresponding measurement information and is received by a sensor along with the corresponding measurement information. Examples of sensors that are able to receive such ICAO aircraft addresses include an automatic dependent surveillance-broadcast (ADS-B) sensor and a traffic collision avoidance system (TCAS) mode S sensor. Another type of track ID is an identifier from a sensor that correlates measurements over time. In particular, such sensors identify tracks of objects by correlating measurements over time and assigning an ID to those tracks. These IDs are provided by the sensor along with the measurements. Since these IDs are generated by a sensor that correlates its own measurements over time, these IDs are sensor specific. That is, even though a first sensor and a second sensor may be obtaining measurements of the same object, the first sensor and second sensor correlate their own measurements, not the measurements of the other sensor; therefore, the track ID provided by each sensor is different and corresponds to the measurements from that sensor not the other sensor. Examples of a sensor that provides such a track ID for correlated measurements include a TCAS mode C sensor, certain LiDARs, and certain radars. The subject matter described herein utilizes these track IDs to improve the accuracy and efficiency with which multiple objects can be tracked in a PHD filter.

Figure 1:
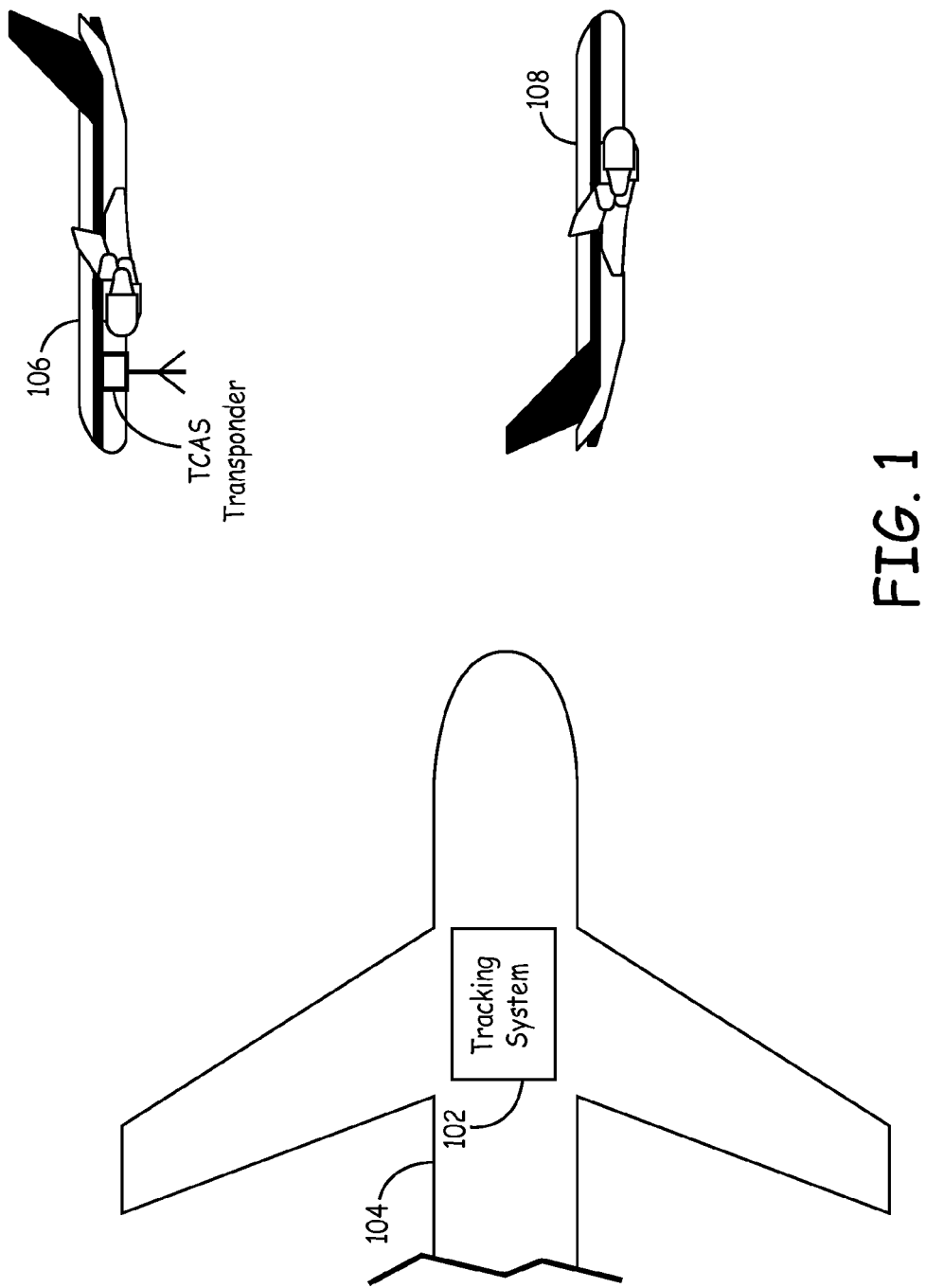
FIG. 1 is a block diagram of an example environment in which a PHD filter based tracking system may be used.

FIG. 1 is a block diagram of an example environment in which a PHD filter based tracking system 102 may be used. In the example shown herein, the tracking system 102 is installed within an aircraft 104, however, the tracking system 102 can be installed within any vehicle or can be a standalone system. The tracking system 102 is configured to detect and track other objects in the environment. In this example, the tracking system 102 is configured to detect objects in the air such as intruder aircraft (IA) 106, 108. In an example, the tracking system 102 is part of a sense-and-avoid (SAA) system and the aircraft 104 is an unmanned aircraft system (UAS).

Figure 2:
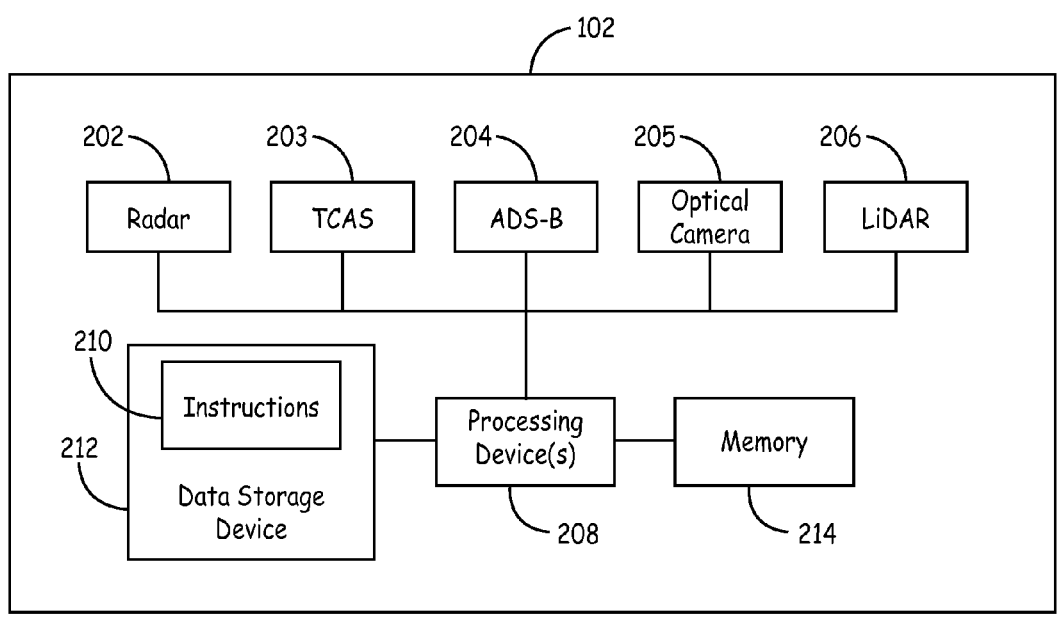
FIG. 2 is a block diagram of an example tracking system used in the environment of FIG. 1.

FIG. 2 is a block diagram of an example tracking system 102. The tracking system 102 includes a plurality of sensors 202-206 configured to detect objects in the environment around the sensors 202-206. The plurality of sensors 202-206 can include any suitable sensor such as a radar 202, TCAS sensor 203, ADS-B sensor 204, optical camera 205, and a LiDAR 206. Other sensors may be used as well. Additionally, any number of sensors including multiple of the same type of sensors may be used. The sensors 202-206 are coupled to one or more processing devices 208. The sensors 202-206 are configured to obtain measurements and send the measurements to the one or more processing devices 208. As mentioned above, some or all of the sensors 202-206 can be configured to send a track ID along with a measurement to the one or more processing devices 208.

The one or more processing devices 208 are configured to track a plurality of objects (such as intruder aircraft 106, 108) based on the measurements received from the sensors 202-206. To track the objects, the one or more processing devices 208 are configured to execute instructions 210 stored on one or more data storage devices 212 coupled to the one or more processing devices 208. The instructions 210, when executed by the one or more processing devices 208, cause the one or more processing devices 208 to implement the actions to track objects based on the measurements from the sensors 202-206. The one or more processing devices 208 can include a central processing unit (CPU), microcontroller, microprocessor, (e.g., a digital signal processor), field programmable gate array (FPGA), application specific integrated circuit (ASIC), or other processing device. In certain examples, the one or more data storage devices 212 include a non-volatile electronic hardware device for storing machine readable data and instructions. In an example, the one or more data storage devices 212 store information on any appropriate computer readable medium used for storage of computer readable instructions or data structures. The computer readable medium can be implemented as any available media that can be accessed by the one or more processing devices 208. Suitable computer readable media may include storage media such as magnetic or optical media. For example, storage media can include a conventional hard disk, Compact Disk-Read Only Memory (CD-ROM), solid state drive (SSD), other flash memory, Read Only Memory (ROM), and Electrically Erasable Programmable ROM (EEPROM). The one or more processing devices 208 are also coupled to memory 214 that is configured to store data and instructions during execution by the one or more processing devices 208. The memory 214 can include volatile or non-volatile media such as Random Access Memory (RAM) (including, but not limited to, Synchronous Dynamic Random Access Memory (SDRAM), Double Data Rate (DDR) RAM, RAMBUS Dynamic RAM (RDRAM), and Static RAM (SRAM), etc.). In an example, the one or more processing devices 208 are configured to output information regarding the tracks of the objects to an output device such as a display device. In some examples, the one or more processing devices 208 provide the track information to a larger SAA system for controlling movement of an unmanned aircraft system.

Figure 3:
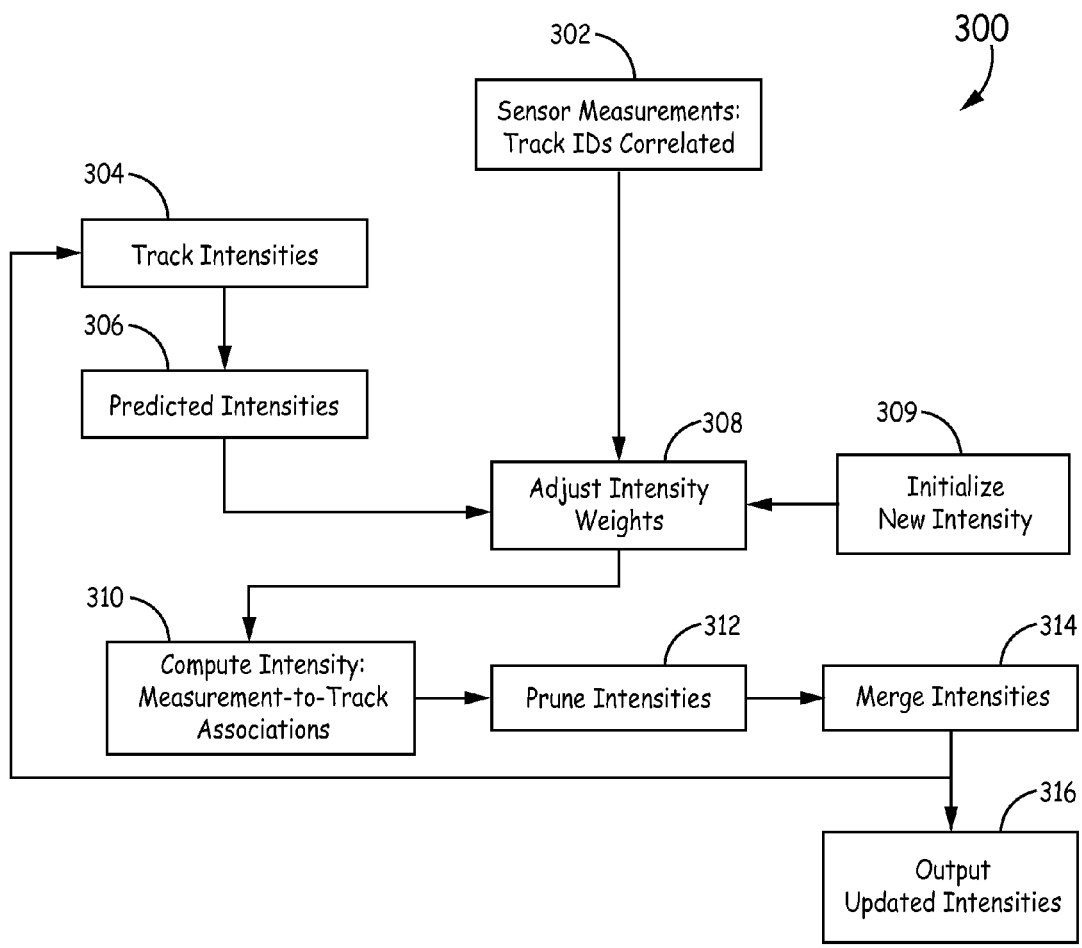
FIG. 3 is a flow diagram of an example method for tracking a plurality of objects with the tracking system of FIG. 2.

FIG. 3 is a flow diagram of an example method 300 for tracking a plurality of objects with the tracking system 102. The tracking system 102 implements a loop that computes a plurality of intensities and updates the intensities during each loop based on newly obtained measurements from the sensors 202-206. The loop operates in real time to track a plurality of objects that are measured by the sensors 202-206. As discussed above, the loop implements a probabilistic hypothesis density (PHD) filter to update the intensities. The PHD filter loop attempts to maintain a single intensity for each object being tracked. In the case of a tracking system 102 for an aircraft 104, the PHD filter loop attempts to maintain a single intensity for each intruder aircraft 106, 108, and/or other airborne objects within a field-of-view of a sensor 202-206. During a given loop, one or more intensities are maintained corresponding to the number of objects being tracked at that time. Each iteration through the loop updates each intensity being maintained to the next time step unless the particular intensity is deleted (no longer tracked).

The tracking method 300 operates on measurements that have a track ID associated therewith that was provided by a sensor 202-206. Accordingly, one or more measurements and their associated track IDs are provided by the sensors 202-206 (block 302). The one or more measurements each have a single respective track ID associated therewith. In some examples, other measurements that do not have a track ID associated therewith are also obtained by the sensors 202-206. These other measurements can also be used to update intensities maintained by the loop of method 300 in a manner known to those skilled in the art. Actions to update intensities with such other measurements are not shown in FIG. 3.

The tracking method 300 utilizes the track IDs provided by the sensors 202-206 to determine whether and/or how to adjust a weight of an intensity during the update loop. The weight of an intensity corresponds to the likelihood that an intensity is tracking an actual object being sensed by the sensors 202-206. The more measurements obtained by the sensors 202-206 that correspond to an intensity, the more likely it is that the intensity corresponds to an actual object. Additionally, the weight can be used to manage the intensities operated on by the tracking method 300. In particular, an intensity that is more accurate than another intensity can be given a higher weight that the other intensity in order to increase the likelihood that the more accurate intensity is used and decrease the likelihood that the less accurate intensity is used.

The tracking method 300 utilizes the track IDs provided with the measurements as a quick and effective way to estimate when a measurement has been obtained that corresponds to a given intensity. This information can be used to determine whether and/or how much to update the given intensity. In order to do this, the tracking method 300 associates one or more track IDs with a currently maintained intensity. In some examples, all currently maintained intensities have at least one track ID associated therewith, however, in other examples one or more of the currently maintained intensities may not have a track ID associated therewith. In any case, the intensities that do have a track ID associated therewith can proceed through the method 300 as described herein. Any intensity that does not have a track ID associated therewith can be updated in any suitable manner including in a manner known to those skilled in the art. Actions to update an intensity that does not have a track ID associated therewith are not shown in FIG. 3.

As mentioned above, each loop of method 300 updates each intensity (that is not deleted) to the next time step. As used herein, time steps are referred to as $T_k$, $T_{k+1}$ for the time step that immediately follows time step $T_k$, $T_{k+2}$ for the time step that immediately follows time step $T_{k+1}$, etc. The length of time corresponding to a time step can be determined in any suitable manner, such as based on the frequency of measurements provided by one or more of the sensors 202-206. For a given loop of the method 300, the one or more measurements provided by the sensors 202-206 correspond to the time step at which the one or more intensities are being updated. In an example loop, therefore, the one or more intensities input into the loop (block 304) correspond to time step $T_k$ and the one or more measurements input into the loop (block 302) correspond to time step $T_{k+1}$. During this iteration of the loop, the one or more intensities are predicted to time step $T_{k+1}$ and updated to time step $T_{k+1}$ using the one or more measurements that correspond to time step $T_{k+1}$.

In an example, one or more $T_k$ intensities (intensities corresponding to time step $T_k$) are provided (block 304) from the previous iteration of the loop. The one or more $T_k$ intensities are the one or more intensities that were output from the previous iteration of the loop. In examples where the tracking system 102 provides tracks of objects to an SAA system, the one or more $T_k$ intensities are output to the SAA system as the tracks for time step $T_k$. Each intensity progresses through multiple intermediate stages during updating by method 300. An intensity that has completed updating for a given time step and is output (e.g., to an SAA system) is referred to herein as a "track intensity". Accordingly, the one or more $T_k$ intensities input into the loop of method 300 are also referred to herein as one or more $T_k$ "track" intensities.

Ignoring any $T_k$ track intensities that do not have a track ID associated therewith (as discussed above), each of one or more $T_k$ track intensities has a respective one or more track IDs associated therewith. Each of these track IDs corresponds to one or more measurements from a sensor 202-206 that have been used to update (in a previous time step) the $T_k$ track intensity. The one or more track IDs can correspond to measurements that have been used to update the $T_k$ track intensity at any time step including and previous to the $T_k$ time step. For example, the respective one or more track IDs can correspond to measurements that have been used to update the corresponding $T_k$ track intensity at the $T_k$ time step, the $T_{k-1}$ time step, the $T_{k-2}$ time step, etc. More detail regarding the process of associating one or more track IDs with a track intensity is provided below.

Each of the one or more $T_k$ track intensities is propagated forward in time by first generating a predicted intensity for time step $T_{k+1}$ (a $T_{k+1}$ predicted intensity) (block 306) for each of the one or more $T_{k+1}$ track intensities. These one or more $T_{k+1}$ predicted intensities can be computed in any suitable manner including in ways known to those skilled in the art. Computing the one or more $T_{k+1}$ predicted intensities includes computing a predicted weight for each $T_{k+1}$ predicted intensity. The predicted weight can be computed in any suitable manner, and is a weight prediction for the corresponding $T_k$ track intensity during the $T_{k+1}$ time step. Additionally, the one or more track IDs that are associated with a given $T_k$ track intensity are associated with the $T_{k+1}$ predicted intensity corresponding to that $T_k$ track intensity.

Initially, the predicted weight for a $T_{k+1}$ predicted intensity is computed without considering whether any measurements from the one or more measurements (block 302) for time step $T_{k+1}$ correspond to the $T_{k+1}$ predicted intensity. Then the predicted weight for each $T_{k+1}$ predicted intensity is adjusted (block 308) based on whether any of a first one or more track IDs from the one or more measurements match the one or more track IDs for that respective $T_{k+1}$ predicted intensity as explained below.

In an example, if any of the track IDs provided by a sensor 202-206 for a given time step match a track ID associated with a predicted intensity, then the weight of that predicted intensity is adjusted downwards as compared to if no track IDs provided by the sensors 202-206 match. The track IDs are used as an estimation of when a measurement is associated with an intensity. If a track ID from the sensors 202-206 matches a track ID associated with a predicted intensity, it is more likely that the measurement corresponding to that track ID corresponds to that predicted intensity, which justifies adjusting the weight of that intensity downwards as compared to predicted intensities that do not have such a matching track ID.

As mentioned, the one or more measurements (block 302) from the sensors 202-206 collectively have a first one or more track IDs provided therewith. Based on the one or more measurements and the predicted intensities, measurement-to-track associations are computed (block 310). Computing a measurement-to-track association results in generating a measurement-to-track intensity by updating a predicted or new intensity with one of the measurements such that the resulting measurement-to-track intensity is the predicted/new intensity adjusted to incorporate the (new) measurement. The predicted/new intensities are updated based on the track IDs associated therewith. The first one or more track IDs (from the measurements) are compared with the one or more track IDs associated with each respective $T_{k+1}$ predicted intensity to determine whether any of the first one or more track IDs match any of the one or more track IDs associated with each respective $T_{k+1}$ predicted intensity. In an example, to compare the first one or more track IDs with one or more track IDs associated with a $T_{k+1}$ predicted intensity, each track ID from the first one or more track IDs is compared with each track ID of the one or more track IDs associated with the $T_{k+1}$ predicted intensity. A match occurs when a track ID from the first one or more track IDs is the same as a track ID from the one or more track IDs associated with a respective $T_{k+1}$ predicted intensity. Measurement-totrack intensities are generated based on whether there is a match between a track ID of a measurement and a track ID of a $T_{k+1}$ predicted intensity.

In addition to track IDs, a statistical distance test can also be used to determine whether to generate a measurement-to-track intensity. The statistical distance test includes computing a statistical distance between an intensity and a measurement. Any suitable distance test can be used, such as a Malhanobis distance test. In an example, the statistical distance is compared to a threshold.

If a track ID from a measurement matches a track ID from a $T_{k+1}$ predicted intensity and the statistical distance between the measurement and the $T_{k+1}$ predicted intensity is below the threshold, the $T_{k+1}$ predicted intensity is updated with the measurement to generate a measurement-to-track intensity. If there is not a matching track ID or the statistical distance is above the threshold for a given pair of a measurement and a $T_{k+1}$ predicted intensity, then that $T_{k+1}$ predicted intensity is not updated with that measurement; therefore, no measurement-to-track intensity is generated for that pair.

When a measurement-to-track intensity is generated, it is more desirable to proceed in the loop with the measurement-to-track intensity than with the $T_{k+1}$ predicted intensity from which that measurement-to-track intensity was created, because the measurement-to-track intensity includes the information from the most recent measurement, which is not included in the $T_{k+1}$ predicted intensity. This is true unless the $T_{k+1}$ predicted intensity has other track IDs associated with it that do not have corresponding measurement-to-track intensities. In such a situation, it is desirable to keep the $T_{k+1}$ predicted intensity as well as the measurement-to-track intensity.

Thus, in some situations, when a measurement-to-track intensity is generated, the method 300 adjusts downward the weight of the $T_{k+1}$ predicted intensity from which the measurement-to-track intensity was created such that the $T_{k+1}$ predicted intensity is pruned (no longer maintained). In conjunction with the downward adjustment of the weight of the $T_{k+1}$ intensity, the weight of the measurement-to-track intensity is adjusted to a level such that the measurement-to-track intensity survives pruning (is not pruned) and, therefore, is maintained. Since when a measurement-to-track intensity is generated there is a track ID that matches the $T_{k+1}$ predicted intensity, the track ID match is used to determine how to adjust the weight of the predicted intensity.

The predicted weight of a $T_{k+1}$ predicted intensity is adjusted downward (block 308) by multiplying the predicted weight by a first value, if all of the track IDs associated with the $T_{k+1}$ predicted intensity have a matching track ID in the first one or more track IDs corresponding to the measurements obtained by the sensors 202-206 (block 302). In an example, the first value is selected such that the weight of the $T_{k+1}$ predicted intensity after multiplying is near zero. For example, the first value can be less than 0.2. In a specific example, the first value is 0.01. If less than all of the track IDs associated with the $T_{k+1}$ predicted intensity have a matching track ID in the first one or more track IDs, then the weight of the predicted intensity can be multiplied by a second value. This second value can be the value of 1 such that the weight does not change or can be a different value such as 0.8. This process can be repeated for each $T_{k+1}$ predicted intensity such that the predicted weight for each $T_{k+1}$ predicted intensity is adjusted based on the track ID comparison.

Since there are situations when a measurement-to-track intensity is not created even though there may be a track ID match, the weight of a $T_{k+1}$ predicted intensity can be adjusted again after being reduced by being multiplied by the first value. For example, if the weight of a $T_{k+1}$ predicted intensity is reduced by multiplying it by the first value as described above, but a measurement-to-track intensity corresponding to that $T_{k+1}$ predicted intensity is not created (e.g., because the statistical distance between the measurement and the $T_{k+1}$ predicted intensity was above the threshold), then the weight for the $T_{k+1}$ predicted intensity is re-adjusted upwards so that the $T_{k+1}$ predicted intensity is not pruned. In an example, re-adjusting the weight of the $T_{k+1}$ predicted intensity includes multiplying the weight by the inverse of the first value such that the weight is reset back to where it was before being multiplied by the first value.

When a measurement-to-track intensity is created, the weight for the measurement-to-track intensity can be set based on the statistical distance between the corresponding measurement and the $T_{k+1}$ predicted intensity and the weight of the $T_{k+1}$ predicted intensity prior to being adjusted by the first value.

As mentioned above, one or more new intensities can also be created for time step $T_{k+1}$ (block 309). These new intensities can be created in any suitable manner including in ways known to those skilled in the art. Measurement-to-track intensities can be generated for the new intensities by comparing the track IDs and statistical distances as described above with respect to the $T_{k+1}$ predicted intensities. Each of the one or more new intensities also has a predicted weight corresponding thereto. The predicted weight of each of the one or more new intensities can also be adjusted based on the track ID comparison in the same manner as described above with respect to the $T_{k+1}$ predicted intensities.

The one or more predicted intensities, any new intensities, and any measurement-to-track intensities are then further processed by pruning (block 312). Pruning includes analyzing the one or more predicted intensities, any new intensities, and any measurement-to-track intensities to determine whether to delete any of the intensities. Among other things, pruning attempts to delete intensities that are not tracking an actual object.

In an example, intensities are pruned based on their weight. In particular, the weight of an intensity is compared to a threshold. If the weight is lower than the threshold the intensity is deleted, and if the weight is higher than the threshold, the intensity is maintained (not deleted). In an example, the threshold is dynamically set for each intensity based on the track IDs associated with that intensity. Pruning intensities based on dynamically setting the threshold based on the track IDs is part of a process to manage the track IDs that are maintained with the intensities. In particular, this process is used to delete intensities having track IDs from a sensor that is no longer tracking the object.

Each of the predicted intensities, new intensities, and measurement-to-track intensities that is processed by method 300 has one or more track IDs associated therewith. The one or more track IDs associated with a predicted intensity are the same one or more track IDs that were associated with the track intensity from which the predicted intensity was created. For a new intensity, the one or more track IDs associated therewith can be one or more track IDs from any measurements used to create the new intensity. For example, a new intensity can be created based on a measurement from the one or more measurements (302) that is not used for a measurement-to-track association. Such a measurement can be determined to correspond to a possible new object and, therefore, can be used to create a new intensity based thereon. A track ID for the new intensity, therefore, can correspond to the measurement that was used to create the intensity. For a measurement-to-track intensity, the track ID associated therewith is the track ID from the measurement of the one or more measurements in the current time step that was used to update the predicted intensity to generate the measurement-to-track intensity.

For a track intensity, the track intensity maintains all track IDs from any intensity used to create the track intensity. For example, if no intensities are merged with a given track intensity as it is updated to the next time step, the updated track intensity maintains the same track ID(s) as the previous corresponding track intensity. If, however, a first intensity is merged (block 314) with a second one or more intensities to create an updated track intensity, the updated track intensity has associated therewith all the track IDs from the first intensity and the second one or more intensities. The first intensity and the second one or more intensities can be any type of intensity including a predicted intensity, a measurement-to-track intensity, and a new intensity. Accordingly, if a predicted intensity and a measurement-to-track intensity are merged to form a track intensity, that track intensity has associated therewith, all the track ID(s) associated with the predicted intensity and the track ID associated with the measurement-to-track intensity.

Accordingly, a predicted intensity can have one track ID or multiple track IDs associated therewith, while a new intensity and a measurement-to-track intensity can have only one intensity associated therewith. Over time one or more of the track IDs associated with a track intensity may come from a sensor that can no longer track the corresponding object. In such a situation, it is desirable to no longer maintain that track ID as associated with that track intensity. Dynamically setting the threshold accomplishes this by setting the threshold higher for intensities have more track IDs associated therewith. With a higher threshold, an intensity having multiple track IDs needs to have a higher weight to be maintained. Ideally, the lack of a measurement corresponding to one of the track IDs associated with the intensity will, over relatively few iterations of the loop, cause the weight to drop low enough to be below the (elevated) threshold. The object corresponding to the loop, however, may still be tracked via a measurement-to-track intensity that may be maintained since it will likely have a lower threshold because a measurement-to-track intensity only has a single track ID associated therewith. Moreover, since a measurement-to-track intensity is an updated version of a predicted intensity, even if the predicted intensity is deleted, the information embodied by the predicted intensity can still be maintained via the measurement-to-track intensity.

In an example, each sensor has a respective sensor threshold, and the threshold for comparing a weight against is set to the sum of the sensor thresholds for each sensor having a track ID associated with the intensity. In an example, the sensor threshold is selected based on the accuracy of the sensor. In this way, sensors that are more accurate, which typically results in a higher weighted intensity, have a higher threshold which provides a more strict exclusion of erroneous measurements from such a sensor. As an example, if a first predicted intensity has three track IDs associated therewith, the threshold for comparing against the weight is the sum of the sensor thresholds of the sensors corresponding to the three track IDs. For example, if a first of the three track IDs is from a TCAS mode S sensor, a second track ID is from a first radar, and a third track ID is from a second radar, then the threshold for comparing against the weight for that intensity is the sum of the sensor threshold for the TCAS mode S sensor, the sensor threshold for the first radar, and the sensor threshold for the second radar.

The process of computing the threshold and then comparing the weight to the threshold is repeated for each of the one or more predicted intensities, any new intensities, and any measurement-to-track intensities. Any such intensity that has a weight below its respective threshold is deleted (block 312), while any intensity having a weight above its respective threshold is maintained and analyzed to be merged.

The intensities that are not pruned are analyzed to be merged (block 314). Any suitable process of merging intensities can be used, including processes known to those skilled in the art. The resulting one or more $T_{k+1}$ track intensities provided from the merge intensity step (block 314) can be output for display and/or further analysis, such as by a SAA system (block 316). The one or more $T_{k+1}$ track intensities are also provided as input into the next iteration of the loop for updating based on one or more measurements for time step $T_{k+2}$.

EXAMPLE EMBODIMENTS

Example 1 includes a method for tracking multiple objects with a probabilistic hypothesis density filter, the method comprising: obtaining a plurality of measurements corresponding to a first object with at least one sensor, the at least one sensor providing one or more first track IDs for the plurality of measurements; generating a $T_k$ track intensity for the first object based on the plurality of measurements, the $T_k$ track intensity including a weight, a state mean vector, and a state covariance matrix of statistics of a track of the first object at time $T_k$; generating a $T_{k+1}$ predicted intensity for the first object based on the $T_k$ track intensity, the $T_{k+1}$ predicted intensity corresponding to time $T_{k+1}$, wherein the $T_{k+1}$ predicted intensity includes a predicted weight based on the weight of the $T_k$ track intensity; obtaining a plurality of measurements from a plurality of sensors, wherein the plurality of sensors include the at least one sensor, wherein the plurality of sensors provide a plurality of second track IDs for the plurality of measurements, wherein the plurality of measurements correspond to time $T_{k+1}$; comparing the plurality of second track IDs to the one or more first track IDs; if all of the one or more first track IDs match any of the plurality of second track IDs, multiplying the predicted weight by a first value; if less than all of the one or more first track IDs match any of the plurality of second track IDs, multiplying the predicted weight by a second value, wherein the second value is greater than the first value; determining whether to prune the $T_{k+1}$ predicted intensity based on the predicted weight after multiplying with either the first value or the second value; and if the $T_{k+1}$ predicted intensity is not pruned, generating a $T_{k+1}$ track intensity for the first object at time $T_{k+1}$ based on the $T_{k+1}$ predicted intensity, the $T_{k+1}$ track intensity having an updated weight based on the multiplying of the predicted weight.

Example 2 includes the method of Example 1, wherein the first value is less than 0.2.

Example 3 includes the method of any of Examples 1-2, wherein determining whether to prune the $T_{k+1}$ predicted intensity includes: comparing the predicted weight after multiplying to a threshold; and if the predicted weight after multiplying is below the threshold, deleting the $T_{k+1}$ predicted intensity.

Example 4 includes the method of Example 3, comprising: selecting the threshold based on the one or more first track IDs.

Example 5 includes the method of Example 4, wherein each of the plurality of sensors has a corresponding sensor threshold, wherein selecting the threshold includes setting the threshold as a sum of the sensor thresholds of the sensors having a track ID in the one or more first track IDs.

Example 6 includes the method of Example 5, wherein the sensor threshold for a sensor of the plurality of sensors is set based on the accuracy of that sensor.

Example 7 includes the method of any of Examples 5-6, wherein setting the threshold includes setting the threshold higher if more of the plurality of sensors have a track ID in the one or more track IDs and lower if fewer of the plurality of sensors have a track ID in the one or more track IDs.

Example 8 includes the method of any of Examples 1-7, wherein each track ID of the one or more first track IDs and the second plurality of track IDs is one of an identifier assigned by a sensor to a set of measurements obtained by that sensor that are correlated across time, or an international civil aviation organization (ICAO) aircraft address received by a sensor and corresponding to a respective measurement for that sensor.

Example 9 includes a method for tracking multiple objects with a probabilistic hypothesis density filter, the method comprising: generating a plurality of intensities, each intensity of the plurality of intensities including a weight, a state mean vector, and a state covariance matrix of statistics of a track of a respective object, wherein each intensity has one or more track IDs associated therewith, wherein each track ID associated with a respective intensity corresponds to a measurement that contributed to that respective intensity; pruning the plurality of intensities to produce a reduced set of intensities, wherein pruning includes in the reduced set of intensities, any intensity in the plurality of intensities having a weight above a respective threshold for that intensity and excludes from the reduced set of intensities, any intensity having a weight below the respective threshold for that intensity, wherein the respective threshold for an intensity is selected based on which one or more track IDs are associated with the respective intensity.

Example 10 includes the method of Example 9, wherein each of the plurality of sensors has a corresponding sensor threshold, wherein the respective threshold for an intensity is set as a sum of the sensor thresholds of the sensors having a track ID associated with the respective intensity.

Example 11 includes the method of Example 10, wherein the sensor threshold for a respective sensor of the plurality of sensors is set based on the accuracy of the respective sensor.

Example 12 includes the method of any of Examples 10-11, wherein the respective threshold for an intensity is set higher if more of the plurality of sensors have a track ID associated with the respective intensity and lower if fewer of the plurality of sensors have a track ID associated with the respective intensity.

Example 13 includes the method of any of Examples 9-12, wherein the plurality of intensities include one or more of a predicted intensity, a measurement-to-track intensity, and a new intensity.

Example 14 includes the method of any of Examples 9-13, wherein each track ID of the one or more track IDs is one of an identifier assigned by a sensor to a set of measurements obtained by that sensor that are correlated across time, or an international civil aviation organization (ICAO) aircraft address received by a sensor and corresponding to a respective measurement for that sensor.

Example 15 includes a tracking system comprising: one or more processing devices; and one or more data storage devices including instructions which, when executed by the one or more processing devices, cause the one or more processing devices to track multiple objects with a probabilistic hypothesis density filter, wherein the instructions cause the one or more processing devices to: generate a plurality of $T_k$ track intensities, each $T_k$ track intensity of the plurality of $T_k$ track intensities including a weight, a state mean vector, and a state covariance matrix of statistics of a track of a respective object at time $T_k$, wherein each $T_k$ track intensity has one or more track IDs associated therewith, wherein each track ID associated with a respective $T_k$ track intensity corresponds to a measurement that contributed to that respective $T_k$ track intensity; generate a plurality of $T_{k+1}$ predicted intensities based on the $T_k$ track intensities, the plurality of $T_{k+1}$ predicted intensities corresponding to time $T_{k+1}$, wherein each of the plurality of $T_{k+1}$ predicted intensities includes a predicted weight based on the weight of the $T_k$ predicted intensity; obtain a plurality of measurements from a plurality of sensors, wherein the plurality of sensors provide a plurality of second track IDs for the plurality of measurements, wherein the plurality of measurements correspond to time $T_{k+1}$; compare the plurality of second track IDs to each track ID associated with each $T_k$ track intensity; if all of the track IDs associated with a given $T_k$ track intensity match any of the plurality of second track IDs, multiply the predicted weight of the $T_{k+1}$ predicted intensity corresponding to the given $T_k$ track intensity by a first value; if less than all of the track IDs associated with a given $T_k$ intensity match any of the plurality of second track IDs, multiply the predicted weight of the $T_{k+1}$ predicted intensity corresponding to the given $T_k$ track intensity by a second value, wherein the second value is greater than the first value; prune the plurality of $T_{k+1}$ predicted intensities based on their respective predicted weight after multiplying with the first value or the second value; and generate a plurality of $T_{k+1}$ track intensities based on the $T_{k+1}$ predicted intensities that are not pruned, each $T_{k+1}$ track intensity of the plurality of $T_{k+1}$ track intensities corresponding to time $T_{k+1}$ and having an updated weight based on the predicted weight of the respective $T_{k+1}$ predicted intensity after multiplying.

Example 16 includes the tracking system of Example 15, wherein the first value is less than 0.2.

Example 17 includes the tracking system of any of Examples 15-16, wherein prune the plurality of $T_{k+1}$ predicted intensities includes: compare the predicted weight of each $T_{k+1}$ predicted intensity of the plurality of $T_{k+1}$ predicted intensities after multiplying to a respective threshold for that $T_{k+1}$ predicted intensity; and if a given weight after multiplying is below its respective threshold, delete that $T_{k+1}$ predicted intensity.

Example 18 includes the tracking system of Example 17, wherein the instructions cause the one or more processing devices to: select each respective threshold based on one or more track IDs associated with the $T_k$ track intensity corresponding to that respective threshold.

Example 19 includes the tracking system of Example 18, wherein each of the plurality of sensors has a corresponding sensor threshold, wherein the respective threshold for a given $T_{k+1}$ predicted intensity is set as a sum of the sensor thresholds having a track ID associated with the $T_k$ track intensity corresponding to the given $T_{k+1}$ predicted intensity.

Example 20 includes the tracking system of any of Examples 15-19, wherein each track ID associated with a $T_k$ track intensity and each of the second plurality of track IDs is one of an identifier assigned by a sensor to a set of measurements obtained by that sensor that are correlated across time, or an international civil aviation organization (ICAO) aircraft address received by a sensor and corresponding to a respective measurement for that sensor.

What is claimed is:

1. A method for tracking multiple objects with a probabilistic hypothesis density filter, the method comprising:
   receiving one or more reflected signals in at least one sensor from a first object in an environment around a vehicle, wherein the at least one sensor is onboard the vehicle;
   detecting the received one or more reflected signals in the at least one sensor;
   computing a first set of measurements based on the detected one or more reflected signals for the first object, the at least one sensor providing one or more first track IDs for the first set of measurements;
   generating a $T_k$ track intensity for the first object based on the first set of measurements, the $T_k$ track intensity including a weight, a state mean vector, and a state covariance matrix of statistics of a track of the first object at time $T_k$;
   generating a $T_{k+1}$ predicted intensity for the first object based on the $T_k$ track intensity, the $T_{k+1}$ predicted intensity corresponding to time $T_{k+1}$, wherein the $T_{k+1}$ predicted intensity includes a predicted weight based on the weight of the $T_k$ track intensity;
   receiving a plurality of reflected signals in a plurality of sensors onboard the vehicle, wherein the plurality of sensors include the at least one sensor;
   detecting the received plurality of reflected signals in the plurality of sensors;
   computing a second set of measurements based on the detected plurality of reflected signals in the plurality of sensors, wherein the plurality of sensors provide a plurality of second track IDs for the second set of measurements, wherein the second set of measurements correspond to time $T_{k+1}$;
   comparing the plurality of second track IDs to the one or more first track IDs;
   if all of the one or more first track IDs match any of the plurality of second track IDs, multiplying the predicted weight by a first value;
   if less than all of the one or more first track IDs match any of the plurality of second track IDs, multiplying the predicted weight by a second value, wherein the second value is greater than the first value;
   determining whether to prune the $T_{k+1}$ predicted intensity based on the predicted weight after multiplying with either the first value or the second value; and
   if the $T_{k+1}$ predicted intensity is not pruned, generating a $T_{k+1}$ track intensity for the first object at time $T_{k+1}$ based on the $T_{k+1}$ predicted intensity, the $T_{k+1}$ track intensity having an updated weight based on the multiplying of the predicted weight.

2. The method of claim 1, wherein the first value is less than 0.2.

3. The method of claim 1, wherein determining whether to prune the $T_{k+1}$ predicted intensity includes:
   comparing the predicted weight after multiplying to a threshold; and
   if the predicted weight after multiplying is below the threshold, deleting the $T_{k+1}$ predicted intensity.

4. The method of claim 3, further comprising:
   selecting the threshold based on the one or more first track IDs.

5. The method of claim 4, wherein each of the plurality of sensors has a corresponding sensor threshold,
   wherein selecting the threshold includes setting the threshold as a sum of the sensor thresholds of the sensors having a track ID in the one or more first track IDs.

6. The method of claim 5, wherein the sensor threshold for a sensor of the plurality of sensors is set based on the accuracy of that sensor.

7. The method of claim 5, wherein setting the threshold includes setting the threshold higher if more of the plurality of sensors have a track ID in the one or more track IDs and lower if fewer of the plurality of sensors have a track ID in the one or more track IDs.

8. The method of claim 1, wherein each track ID of the one or more first track IDs and the plurality of second track IDs is one of an identifier assigned by an aircraft sensor to a set of measurements obtained by the aircraft sensor that are correlated across time, or an aircraft address received by the aircraft sensor and corresponding to a respective measurement of the aircraft sensor.

9. A method for tracking multiple objects with a probabilistic hypothesis density filter, the method comprising:
   receiving a plurality of reflected signals in a plurality of sensors from multiple objects in an environment around a vehicle, wherein the sensors are onboard the vehicle;
   detecting the received reflected signals in the sensors;
   computing a plurality of measurements based on the detected reflected signals for the multiple objects;
   generating a plurality of intensities, each intensity of the plurality of intensities including a weight, a state mean vector, and a state covariance matrix of statistics of a track of a respective one of the objects, wherein each intensity has one or more track IDs associated therewith, wherein each track ID associated with a respective intensity corresponds to a measurement that contributed to that respective intensity;
   pruning the plurality of intensities to produce a reduced set of intensities, wherein pruning includes in the reduced set of intensities, any intensity in the plurality of intensities having a weight above a respective threshold for that intensity and excludes from the reduced set of intensities, any intensity having a weight below the respective threshold for that intensity,
   wherein the respective threshold for an intensity is selected based on which one or more track IDs are associated with the respective intensity;
   wherein the plurality of intensities include one or more of a predicted intensity, a measurement-to-track intensity, and a new intensity.

10. The method of claim 9, wherein each of the plurality of sensors has a corresponding sensor threshold,
    wherein the respective threshold for an intensity is set as a sum of the sensor thresholds of the sensors having a track ID associated with the respective intensity.

11. The method of claim 10, wherein the sensor threshold for a respective sensor of the plurality of sensors is set based on the accuracy of the respective sensor.

12. The method of claim 10, wherein the respective threshold for an intensity is set higher if more of the plurality of sensors have a track ID associated with the respective intensity and lower if fewer of the plurality of sensors have a track ID associated with the respective intensity.

13. The method of claim 9, wherein each track ID of the one or more track IDs is one of an identifier assigned by an aircraft sensor to a set of measurements obtained by the aircraft sensor that are correlated across time, or an aircraft address received by the aircraft sensor and corresponding to a respective measurement of the aircraft sensor.

14. A tracking system for a vehicle, comprising:
one or more processing devices onboard the vehicle;
a plurality of sensors onboard the vehicle and operatively coupled to the one or more processing devices; and
one or more data storage devices onboard the vehicle and including instructions which, when executed by the one or more processing devices, cause the one or more processing devices to track multiple objects in an environment around the vehicle with a probabilistic hypothesis density filter, wherein the instructions cause the one or more processing devices to:
 detect a first set of reflected signals received by the plurality of sensors from multiple objects in the environment around the vehicle;
 compute a first set of measurements based on the detected first set of reflected signals;
 generate a plurality of $T_k$ track intensities, each $T_k$ track intensity of the plurality of $T_k$ track intensities including a weight, a state mean vector, and a state covariance matrix of statistics of a track of a respective object at time $T_k$, wherein each $T_k$ track intensity has one or more first track IDs associated therewith, wherein each first track ID associated with a respective $T_k$ track intensity corresponds to one of the first set of measurements that contributed to that respective $T_k$ track intensity;
 generate a plurality of $T_{k+1}$ predicted intensities based on the $T_k$ track intensities, the plurality of $T_{k+1}$ predicted intensities corresponding to time $T_{k+1}$, wherein each of the plurality of $T_{k+1}$ predicted intensities includes a predicted weight based on the weight of the $T_k$ track intensity;
 detect a second set of reflected signals received by the plurality of sensors from the multiple objects in the environment around the vehicle;
 compute a second set of measurements based on the detected second set of reflected signals, wherein the plurality of sensors provide a plurality of second track IDs for the second set of measurements, wherein the second set of measurements correspond to time $T_{k+1}$;
 compare the plurality of second track IDs to each first track ID associated with each $T_k$ track intensity;
 if all of the first track IDs associated with a given $T_k$ track intensity match any of the plurality of second track IDs, multiply the predicted weight of the $T_{k+1}$ predicted intensity corresponding to the given $T_k$ track intensity by a first value;
 if less than all of the first track IDs associated with a given $T_k$ intensity match any of the plurality of second track IDs, multiply the predicted weight of the $T_{k+1}$ predicted intensity corresponding to the given $T_k$ track intensity by a second value, wherein the second value is greater than the first value;
 prune the plurality of $T_{k+1}$ predicted intensities based on their respective predicted weight after multiplying with the first value or the second value; and
 generate a plurality of $T_{k+1}$ track intensities based on the $T_{k+1}$ predicted intensities that are not pruned, each $T_{k+1}$ track intensity of the plurality of $T_{k+1}$ track intensities corresponding to time $T_{k+1}$ and having an updated weight based on the predicted weight of the respective $T_{k+1}$ predicted intensity after multiplying.

15. The tracking system of claim 14, wherein the first value is less than 0.2.

16. The tracking system of claim 14, wherein the prune of the plurality of $T_{k+1}$ predicted intensities includes:
 compare the predicted weight of each $T_{k+1}$ predicted intensity of the plurality of $T_{k+1}$ predicted intensities after multiplying to a respective threshold for that $T_{k+1}$ predicted intensity; and
 if a given weight after multiplying is below its respective threshold, delete that $T_{k+1}$ predicted intensity.

17. The tracking system of claim 16, wherein the instructions cause the one or more processing devices to:
 select each respective threshold based on one or more track IDs associated with the $T_k$ track intensity corresponding to that respective threshold.

18. The tracking system of claim 17, wherein each of the plurality of sensors has a corresponding sensor threshold, wherein the respective threshold for a given $T_{k+1}$ predicted intensity is set as a sum of the sensor thresholds having a track ID associated with the $T_k$ track intensity corresponding to the given $T_{k+1}$ predicted intensity.

19. The tracking system of claim 14, wherein each track ID associated with a $T_k$ track intensity and each of the second plurality of track IDs is one of an identifier assigned by an aircraft sensor to a set of measurements obtained by the aircraft sensor that are correlated across time, or an aircraft address received by the aircraft sensor and corresponding to a respective measurement of the aircraft sensor.

20. The tracking system of claim 14, wherein:
the vehicle comprises an aircraft; and
the plurality of sensors comprise one or more of a radar, a traffic collision avoidance system (TCAS) sensor, an automatic dependent surveillance-broadcast (ADS-B) sensor, an optical camera, or a LiDAR.

* * * * *